United States Patent
Taguchi et al.

(10) Patent No.: US 9,514,526 B2
(45) Date of Patent: Dec. 6, 2016

(54) DEVICE AND METHOD FOR DETECTING ANGLE OF ROTATION FROM NORMAL POSITION OF IMAGE

(75) Inventors: Jun'ichi Taguchi, Tokyo (JP); Mitsuji Ikeda, Tokyo (JP); Yuichi Abe, Tokyo (JP); Masahiro Kitazawa, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 125 days.

(21) Appl. No.: 14/005,913

(22) PCT Filed: Nov. 9, 2011

(86) PCT No.: PCT/JP2011/075874
§ 371 (c)(1),
(2), (4) Date: Oct. 2, 2013

(87) PCT Pub. No.: WO2012/132090
PCT Pub. Date: Oct. 4, 2012

(65) Prior Publication Data
US 2014/0016824 A1    Jan. 16, 2014

(30) Foreign Application Priority Data
Mar. 25, 2011   (JP) ................. 2011-068891

(51) Int. Cl.
G06K 9/00        (2006.01)
G06T 7/00        (2006.01)
G06K 9/32        (2006.01)

(52) U.S. Cl.
CPC .......... *G06T 7/0004* (2013.01); *G06K 9/3275* (2013.01)

(58) Field of Classification Search
CPC .................................................. G06K 9/3275
See application file for complete search history.

(56) References Cited

U.S. PATENT DOCUMENTS

| | | | |
|---|---|---|---|
| 6,665,449 B1* | 12/2003 | He ....................... | G06K 9/4633 382/162 |
| 6,959,098 B1* | 10/2005 | Alattar ........................ | 382/100 |
| 2005/0035290 A1* | 2/2005 | Saitoh .......................... | 250/307 |
| 2011/0211436 A1* | 9/2011 | Watanabe .............. | G11B 20/10 369/103 |

FOREIGN PATENT DOCUMENTS

| | | |
|---|---|---|
| JP | 58-201182 A | 11/1983 |
| JP | 2005-275950 A | 10/2005 |
| JP | 4434802 B2 | 3/2010 |

OTHER PUBLICATIONS

M. R. Hejazi, G. Shevlyakov, Y-S Ho, "Modified Discrete Radon Transforms and Their Application to Rotation-Invariant Image Analysis," IEEE 8th Workshop on Multimedia Signal Processing, pp. 429-434, Oct. 2006.*

Akiyama et al., "A Segmentation Method for Document Images without the Knowledge of Document Formats", The Transaction of the Institute of Electronics and Communication Engineers of Japan, vol. J66-D, No. 1, Jan. 1983, pp. 111-118.

Hase et al., "Segmentation Method for Document Images by Two Dimentional Fourier Transformation", The Transaction of the Institute of Electronics and Communication Engineers of Japan, vol. J67-D, No. 9, Sep. 1984, pp. 1044-1051.

\* cited by examiner

*Primary Examiner* — Bhavesh Mehta
*Assistant Examiner* — Ian Lemieux
(74) *Attorney, Agent, or Firm* — Mattingly & Malur, PC

(57) ABSTRACT

An evaluation value indicative of the extent of lines in each direction is calculated for a pre-processed image in which 0s are filled in and extended in the lateral direction of the inputted image and which has been reduced ⅛th in the longitudinal direction. To obtain the angle of rotation of an image from the change in the evaluation value obtained while the angle relative to the lateral direction of the pre-processed image is modified in small steps, a parallel line is drawn for each direction, a projection is taken, and the sum of squares serves as the evaluation value of the direction. The direction having the highest evaluation value serves as the obtained direction of rotation from the normal position. The projection of each direction references the point of intersection between the parallel line drawn for each direction and the coordinate line of the horizontal axis.

5 Claims, 14 Drawing Sheets

FOURIER-TRANSFORMED IMAGE

DEVICE AND METHOD FOR DETECTING ANGLE OF ROTATION FROM NORMAL POSITION OF IMAGE

TECHNICAL FIELD

The present invention relates to an image processing technique, particularly, to a technique for detecting a rotation angle from normal position of an image.

BACKGROUND ART

There have been techniques for detecting a rotation angle from normal position of an image.

For example, the following patent literature 1 discloses processing in which the rotation angle (inclination) from normal position of a scanned-in document image is automatically detected and a rotation-corrected image in normal position is generated. According to the patent literature 1, two partial areas of a document image are selected; data projected in each of the partial areas is generated; and the inclination angle of the image is determined based on the correlation between the two projected data. In doing this, based on the amounts of projection in the two selected partial areas, whether sentences are broken to be discontinuous in the selected areas is checked so as to select areas where sentences are continuous.

Also, the following non-patent literature 1 states that it is desirable to rotate a document image repeatedly by a micro-angle while taking a projection at every rotation angle and determining the image position where the absolute value of the difference between projections is the largest as a normal position. Rotating a document image repeatedly by a micro-angle is, however, unrealistic as doing so requires a large volume of calculations to be made. Hence, an image is compressed into an 8*8 size; an approximate angle is roughly determined; an image rotation-corrected by the approximate angle is generated; a partial area of the image is divided into plural zonal areas; each of the plural zonal areas is projected; and the inclination angle of the image is determined based on the phase (displacement magnitude associated with large correlation) of projection of each zonal area.

According to the following non-patent literature 2, a document image is Fourier-transformed, and the rotation angle from normal position of the document image is detected based on a peak position.

CITATION LIST

Patent Literature

Patent Literature 1: Japanese Patent No. 4434802
Non-Patent Literature 1: Teruo Akiyama et al., "Page Component Element Extraction Method Not Dependent on Formatting Information," Journal of the Institute of Electronics and Communication Engineers of Japan, 83/1 Vol. J66-D No. 1, pp. 111-118
Non-Patent Literature 2: Masahiko Hase et al., "Document Image Region Extraction Method Using Two-Dimensional Fourier Transform," Journal of the Institute of Electronics and Communication Engineers of Japan, 84/9 Vol. J67-D No. 9, pp. 1044-1051

SUMMARY OF THE INVENTION

Problem to be Solved by the Invention

The existing techniques described above concern document images. In the case of images, photographed using an SEM (Scanning Electron Microscope), of circuit patterns of semiconductors in a manufacturing process, the images are not necessarily comprised of only those showing holes regularly arranged vertically and horizontally which can be handled like document images showing characters. Circuit pattern images mainly show vertical and horizontal wiring lines, and many of them have no portions where small objects like characters are regularly arranged. Such images are characterized differently from document images, so that the existing techniques described above cannot appropriately handle them. The existing techniques when applied to such images cannot correctly detect rotation angles from normal position of the images.

An object of the present invention is to provide a method of accurately and relatively quickly detecting a rotation angle from normal position of an SEM image of a semiconductor in a manufacturing process.

Means for Solving the Problem

(0) Definitions of Image Coordinate Axes and Line Inclination Angle

Before describing the means of the present invention, how to define the coordinate system of an image or a Fourier-transformed image and how to define an angle will be described. A coordinate system and angles can be defined in various ways. In the present specification, they are defined as illustrated in FIGS. 11 and 12. Namely, an image 1104 is defined based on a left-handed system with an upper left corner point being an origin 1100, an axis extending rightward from the origin 1100 being an X axis 1101, and an axis extending downward from the origin 1100 being a Y axis 1102. The image 1104 is a black-and-white image with each integer coordinate position representing a pixel having a black-and-white brightness value. In cases where the image 1104 is a color image, a black-and-white image can be generated, for example, as a Y image obtained from YUV conversion or through appropriate calculations based on an RGB image. In the present specification, the image size is represented in the form of N*N. With the image origin 1100 being at coordinates (0, 0), the range of the image 1104 is defined by the X coordinate ranging from 0 to N−1 and the Y coordinate ranging from 0 to N−1. The image 1104 has pixels at the integer coordinate positions each having a brightness value. It is also possible to refer to the brightness of a real-number coordinate position by means of appropriate interpolation, for example, cubic convolution based on adjacent pixels.

By Fourier-transforming the image 1104, a Fourier-transformed image 1114 is obtained. The Fourier-transformed image 1114 is also defined based on a left-handed system with an upper left corner point being an origin 1110, an axis extending rightward from the origin 1110 being an X axis 1111, and an axis extending downward from the origin 1110 being a Y axis 1112. Also, the image size is represented in the form of N*N, and it is possible to refer to the pixel value not only at an integer coordinate position but also at a real-number coordinate position by means of appropriate interpolation. Since each image value is a Fourier-transformed value, it is represented by a complex number. There are cases in which an absolute-value image is generated based on the absolute values of complex numbers.

The Fourier-transformed image has a position holding a 0-frequency value, i.e. a frequency origin (0 frequency) 1120. The frequency origin 1120 is at coordinate position (N/2, N/2).

As shown in FIG. 12, when the image 1104 includes a line, for example, line 1201 in the X-axis direction, it is represented in the Fourier-transformed image 1114 by a linear form 1211 having a large value represented along the Y-axis direction and extending through the frequency origin 1120. Also, when the image 1104 includes another line 1202 in the X-axis direction, it is also represented in the Fourier-transformed image 1114 by the linear form 1211 having a large value represented along the Y-axis direction and extending through the frequency origin 1120. The value and phase of the linear form 1211 in the Y-axis direction formed in the Fourier-transformed image differs depending on the sizes and positions of the corresponding lines in the original image. When the image 1104 includes a line 1203 extending in a direction of angle θ relative to the X axis, it is represented in the Fourier-transformed image by a linear form 1213 having a large value represented along the direction at angle θ relative to the Y axis and extending through the frequency origin 1120.

As described above, in the image 1104, the angle of the X axis extending on the positive side is defined as 0, and the angle of counterclockwise rotation is defined as positive. In the Fourier-transformed image 1114, lines included in the image 1104 are represented, as described above, in directions differing 90° from the directions the lines are represented in the image 1104. Hence, in the Fourier-transformed image 1114, the direction extending upward, on the image, from the frequency origin 1120 (on the negative side in terms of the Y axis 1112) is defined to be at angle 0, and the angle of counterclockwise rotation therefrom is defined as positive.

(1) First Means of the Present Invention

A first means of the present invention applied to achieve the object of the invention is a method making use of Fourier transform as described in the following.

First, processing for extracting edges shown on a photographed image is performed. For example, a photographed image is subtracted by an image obtained by smoothing the photographed image (e.g., an image assuming an average of the values of 15*15 pixels). (To be exact, an image showing extracted edges only is not obtained. However, in the image obtained, the edges extracted solidly show, so that, in the present specification, the processing is referred to as edge extraction processing in a broad sense.).

Next, the preprocessed image is Fourier-transformed. For Fourier transform, a high-speed method in which butterfly computation is performed can be used. With an averaged image subtracted from the photographed image in the preprocessing, in the Fourier-transformed image, image values in the vicinity of the frequency origin (0 frequency) are small whereas other components are left, so that the rotation angle of the image can be evaluated easily.

FIG. 13 is a diagram showing a geometric area on the Fourier-transformed image 1114 where an evaluation value to represent the degree of line existence is calculated for every angle. The area defined by a concentric circle 1300 with a radius of N/2 about the frequency origin 1120 is defined as an evaluation area. With the frequency origin 1120 positioned at (N/2, N/2), in the area above and to the left of the frequency origin 1120, points away from the frequency origin 1120 by a distance of N/2 can be referred to as reference points on the image. In the area to the right and to the left of the frequency origin 1120, on the other hand, points away from the frequency origin 1120 by a distance of N/2−1 can be referred to as reference points on the image, but points away from the frequency origin 1120 by a distance of N/2 fall outside the image. This seemingly makes it impossible to refer to such points. In the case of a Fourier-transformed image, however, the left and right edges as well as the top and bottom edges of the image are cyclically connected. Namely, referring to point (x, N) means referring to point (x, 0).

The pixel values of a Fourier-transformed image are represented by complex numbers, and their absolute values are symmetrical with respect to the frequency origin 1120. Therefore, it is a practical approach to make calculations to obtain evaluation values only for one half side of the concentric circle 1300. For example, referring to FIG. 13, in the concentric circle 1300, an area for obtaining evaluation values may range counterclockwise from direction 1302 which is −45° away from direction 1301, defined as being at angle 0°, extending upward from the frequency origin 1120 to, but not including, direction 1303 which is 135° away from direction 1301. Namely, evaluation values are obtained for angles ranging from −45° to 134° in 1° increments. In this way, points away from the frequency origin 1120 by a distance of N/2 can be referred to without taking the cyclic connections into consideration. This makes it unnecessary to devise special processing to be consistent with the cyclic connections, so that the burden of programming is reduced.

To obtain an evaluation value for a direction, every sampling point between the origin and the N/2 point in the direction is referred to. For example, to obtain the evaluation value for the 0° direction, the points (N/2, N/2−1), (N/2, N/2−2), - - - , (N/2, 0) are referred to. The evaluation value for the direction is represented by the sum of squares of absolute values of the values (complex number values) of all the points referred to. The sum of absolute values of the values (complex number values) of all the points referred to may also be made the evaluation value.

The evaluation value for each direction represents the magnitude of the number of lines appearing in the specific direction in the original image before being Fourier-transformed. Therefore, the direction associated with the largest one of the evaluation values obtained for all directions is the direction including the most lines in the image before being Fourier-transformed. According to the properties of an image in a normal position, when horizontal lines account for the largest number among all the lines appearing in the image, the direction (angle) associated with the largest one of all the evaluation values obtained represents the rotation angle from normal position of the image. According to the properties of the normal position of an image, when at least either horizontal lines or vertical lines account for the largest number among all the lines appearing in the image, the direction (angle) associated with the largest one of all the evaluation values obtained represents the rotation angle from normal position of the image, or the direction (angle) is 90° (−90°) away from the normal position.

When the image rotation angle is assumed to exceed neither +45° nor −45°, the direction (angle) where the evaluation data value is larger than in any other direction (angle) is detected. Then, when the angle thus detected is in the range of −45° to +44°, the detected angle is determined as a detected rotation angle, or when the detected angle is in the range of −45° to 134°, the detected angle less 90° is determined as a detected rotation angle.

Also, considering that the directions of −45° and 135° are cyclically connected to have a same evaluation value, average evaluation values obtained by applying a smoothing filter having a predetermined angle width may be newly determined as evaluation values, and the direction associated with the largest one of such evaluation values may be determined as the rotation angle from normal position of the image.

There is, however, a problem with the above described means. Namely, when an image to be evaluated includes lines each of which is widely broken apart, the angle detection error is possibly enlarged making the detection accuracy unstable. To cope with this problem, it may be considered to determine in preprocessing whether the image to be evaluated includes lines which are widely broken apart, then extract an image portion including only a one side part of the broken-apart lines as a separate evaluation image so as to detect a rotation angle with high accuracy. It is, however, difficult to stably extract, from an image showing arbitrary forms, areas including widely broken-apart portions of lines. It is, therefore, preferable not to apply the first means of the present invention to an image including such special forms.

(2) Second Means of the Present Invention

A second means of the present invention is characterized in that the angle detection error is not enlarged even for an image which includes widely broken-apart lines making application of the first means of the present invention inappropriate.

First, an edge image is generated. (Like when applying the first means of the present invention.)

Next, parallel lines are drawn on the edge image, and, using points on the parallel lines as reference points, the evaluation value for the direction of the parallel lines is calculated. Changing the direction of the parallel lines, the evaluation values for all predetermined angles are calculated. The evaluation value for a direction of the parallel lines can be determined, for example, as follows. Reference points are set on the parallel lines drawn on the edge image; the sum of brightness values of reference points on each of the parallel lines is calculated (taking a projection), and the sum of squares of the brightness value sums of the parallel lines is determined as the evaluation value for the parallel line direction. The parallel lines are drawn such that they are horizontally spaced apart by one pixel. Depending on the angle of the parallel lines, the distance between them (distance in the direction perpendicular to them) is changed. This is referred to, in the present specification, as pseudo-Radon transform. In pseudo-Radon transform, the distance between parallel lines (distance in the direction perpendicular to the parallel lines) differs depending on the angle of the parallel lines. In general Radon transform, the distance between parallel lines is uniform regardless of the angle of the parallel lines. Namely, parallel lines are drawn differently for pseudo-Radon transform and for general Radon transform.

For pseudo-Radon transform, when drawing parallel lines on an edge image, setting reference points on the parallel lines and calculating the sum of reference point brightness values on each of the parallel lines (taking a projection), the points of intersection of each of the parallel lines and horizontal axis lines are used as reference points. As viewed along the horizontal axis direction, the horizontal coordinate values of the intersection points on each horizontal axis line have the same fractions below decimal point. The values of such reference points to be read by means of interpolation are identically contributed to by the values of adjacent pixels. Namely, between the reference points on each horizontal axis line, a common multiplying factor can be applied to the values of adjacent pixels for interpolation. Therefore, the reference points on each horizontal axis line require only one multiplying factor to be calculated for use in interpolation, that is, the one multiplying factor can be used for all reference points on the same horizontal axis line. Furthermore, the vertical coordinate of each reference point assumes an integer value, so that it is not necessary to refer to any factor for interpolation in the vertical direction. This enables reference point interpolation to be carried out at high speed. Even when the roles of the horizontal axis and the vertical axis are interchanged, the above advantage concerning the calculation of reference point values can be obtained in carrying out pseudo-Radon transform.

As described above, the evaluation values are calculated at high speed for predetermined angles, and the angle associated with the largest one of the calculated evaluation values is determined as the rotation angle relative to the normal position of the image. It is also possible to obtain, for each of the predetermined angles, an averaged evaluation value by applying a smoothing filter having a predetermined angle width and determine the angle associated with the largest one of the averaged evaluation values as the rotation angle relative to the normal position of the image.

For the second means of the present invention, it is not required that the predetermined angles to be evaluated are uniformly spaced apart. It is possible to make each of the predetermined angles represent the angle of a line connecting a horizontal coordinate point on the central horizontal axis (line of $Y=N/2$) and a horizontal coordinate point on the upper edge line (line of $Y=0$) of an image and to use the discrete angles obtained by shifting the horizontal coordinate on the upper edge line of the image by one sampling point at a time as the predetermined angles.

According to the above-described second means of the present invention, small angles, for example, in a range of $\pm 10°$ can be evaluated at high speed and with high accuracy. When larger angles, for example, in a range of $\pm 30°$ are involved, however, points which cannot be referred to increase in an image edge portion. This results in lowering the evaluation accuracy. Hence, the second means of the present invention is not suitable for evaluating large angles.

(3) Third Means of the Present Invention

A third means of the present invention combines the first and the second means of the present invention. First, an approximate rotation angle of an image is detected by the first means of the present invention. Next, the image is reversely rotated by the appropriate rotation angle detected, thereby generating an image with its rotation approximately corrected. Subsequently, using the second means of the present invention, the rotation angle of the image with its rotation approximately corrected is accurately determined in a small angle range as described above. The approximate rotation angle first determined and the accurate rotation angle next determined are added to determine the rotation angle from normal position of the original image.

Advantageous Effects of Invention

According to the present invention, the rotation angle from normal position of an image can be accurately detected at relatively high speed.

BEST MODE FOR CARRYING OUT THE INVENTION

The present invention has a characteristic in the image processing method used in a device for realizing a function for detecting the rotation angle from normal position of an image.

The image processing method can be implemented, as generally well known, in various forms. For example, with the procedure of image processing according to the present invention described in the following, one having general knowledge of hardware may be able to create hardware for executing the procedure or one having general knowledge of software may be able to create software for realizing the image processing procedure according to the present invention and run the software on a commercially-available general-purpose computer. Also, as well known, in the case of using a general-purpose computer, a storage medium storing the software can be connected to an optional computer to run the software. This makes up an important universal element in implementing the whole of the present invention and can lead to realization of an embodiment in which the software can be installed in an optional part. The software can be stored, for example, in a CD, DVD, memory card, HD, or an external storage device into which the software can be downloaded via Internet.

(1) First Embodiment (1-1) Configuration

Figure 1:
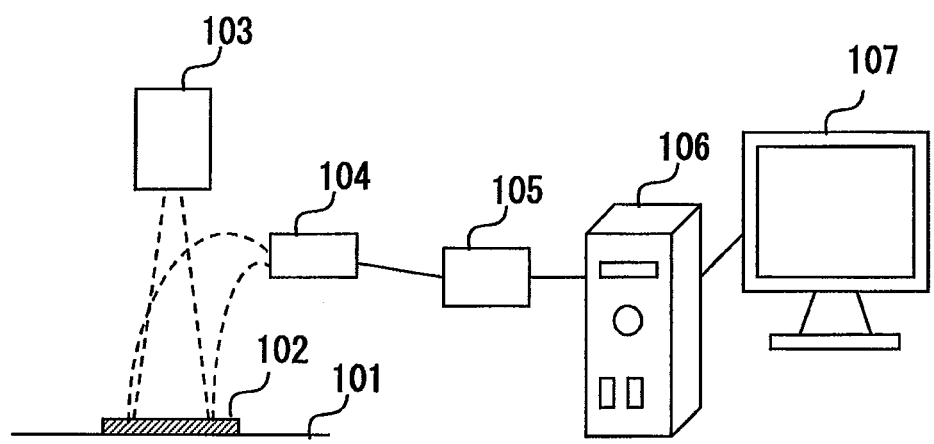
FIG. 1 is a diagram showing the configuration of first to third embodiments of the present invention.

The configuration of a first embodiment of the present invention is shown in FIG. 1.

A scanning electron microscope for inspecting a semiconductor in a manufacturing process has a stage 101 to which an inspection object 102, i.e. a semiconductor with resist applied thereto in a manufacturing process, is carried so as to be in a photographing range of the microscope. An electron gun 103 emits electrons to scan a predetermined area of the inspection object 102. A secondary electron detection unit 104 captures the secondary electrons emitted from the predetermined area of the inspection object 102. An imaging unit 105 generates photographed image data.

To obtain a photographed image, the imaging unit 105 transmits control signals to control operations of the stage 101, the electron gun 103, and the secondary electron detection unit 104, and generates image data by orderly and appropriately positioning the signals detected by the secondary electron detection unit 104.

A computing device 106 receives the photographed image data generated at the imaging unit 105, subjects the image data to required processing, and has the result of image data processing displayed on a display device 107. The computing device 106 may be either an internal device of the scanning electron microscope or an external device.

The present invention relates to the method of image processing performed by the computing device 106. Particularly, the invention has a characteristic in the method of processing, included in the image processing, for detecting a rotation angle from normal position of a photographed image.

(1-2) Outline of Processing Procedure

Figure 2:
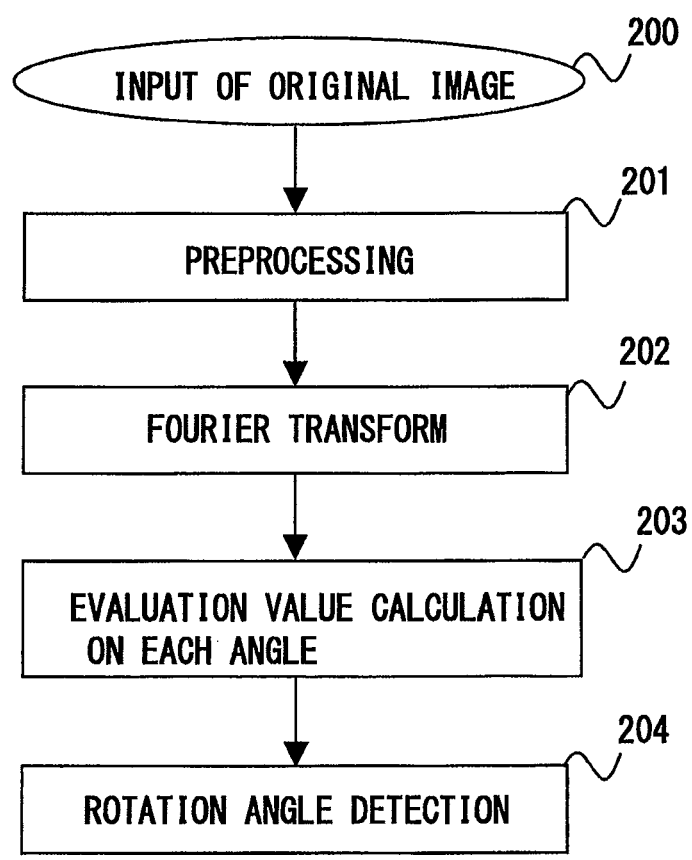
FIG. 2 is a flowchart showing a whole procedure of the first embodiment.

FIG. 2 shows an overall flow of processing for detecting a rotation angle from normal position of a photographed image according to the first embodiment of the present invention. The processing is performed by the computing device 106. The processing will be described in the following with reference to the numbers indicated in FIG. 2 as step numbers.

Step 200: A photographed image of a semiconductor in a manufacturing process is inputted.

Step 201: As preprocessing of the photographed image, an edge image showing detected edges is generated. Edge detection can be performed in various ways. For example, edges of an image can be detected by generating an averaged image by averaging the original image (photographed image) in units of a predetermined size, then subtracting the averaged image from the original image. In a case where the averaging size (unit image area for averaging) is 15*15 pixels, processing is performed for each image point such that the average value of the 15*15 pixels around each image point is made the averaged value of the image point.

Step 202: The preprocessed image is Fourier-transformed. For Fourier transform, a fast computation method referred to as FFT (Fast Fourier Transform) is well known.

Step 203: Based on the Fourier-transformed image, the evaluation value to represent the degree of line existence corresponding to each rotation angle of the original image is calculated. For example, referring to FIG. 13, evaluation value data including 180 evaluation values for as many angles spaced apart by 1° each in the range of −45° to +134° is obtained. How the evaluation values are calculated will be concretely described in the next section.

Step 204: The rotation angle associated with the largest one of the evaluation values for all rotation angles is determined. The rotation angle thus determined is determined as the rotation angle from normal position. The rotation angle from normal position can also be determined by averaging the evaluation value data on each rotation angle using a smoothing filter having a predetermined angle width and determining the rotation angle associated with the largest one of the filtered evaluation value data as the rotation angle from normal position.

(1-3) Concrete Example of Processing in Step 203

When an image including straight lines is Fourier-transformed, in the Fourier-transformed image, too, values tend to concentrate, as described in the foregoing, on straight lines extending through the origin (0 frequency) even though the straight lines in the Fourier-transformed image differ 90° in angle from the straight lines in the original image. Also, the absolute values of pixel values (complex numbers) of a Fourier-transformed image are characterized to be origin-symmetrical, so that it is possible to generate evaluation values by referring to data on one outer side of the origin. For example, the evaluation value V1 (θ) for angle θ can be calculated using the following equation Eq. 1.

$$V1(\theta)=\Sigma(G(N/2-\sin(\theta)*r,N/2-\cos(\theta)*r)**2 \qquad \text{Eq. 1}$$

In the above equation, G(x, y) represents the image value, after Fourier transform, at pixel coordinates (x, y) and 2 denotes squaring. Since an image value after Fourier transform is represented by a complex number, 2 in the above equation denotes squaring a complex number. Also, r represents the distance from the origin. In cases where the size of image G(x, y) is N*N, Σ is the sum of the image values at r=1 through r=N/2.

Figure 13:
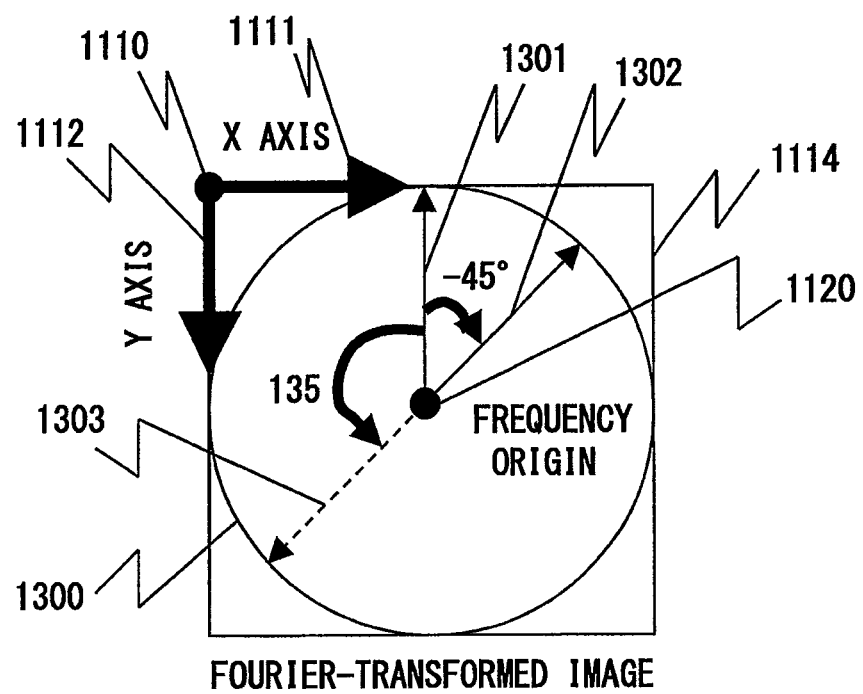
FIG. 13 is a diagram showing angles and an evaluation range on a Fourier-transformed image.

Referring to FIG. 13, Eq. 1 means calculating the sum of squares of evaluation values obtained by referring to every pixel point along direction θ defined in FIG. 13 beginning at the frequency origin 1120.

(1-4) Filter Used in Step 204

When filtering the evaluation value data including the evaluation values for angles ranging from −45° to 134° in increments of 1°, since the evaluation value is the same for −45° and for 135°, cyclic connection is made to cause evaluation of 134° to be followed by evaluation of −45° and a smoothing filter having a predetermined angle width is used. Namely, the evaluation values are smoothed in a predetermined angle width. The filter to be used is of a size having a predetermined angle width, for example, ±3°. A filter type suitable for the object of evaluation can be selected, for example, a simple average filter, a Gaussian average filter, or a triangular filter with a vertex in the center.

(1-5) Example States Occurring During Processing

Figure 3:
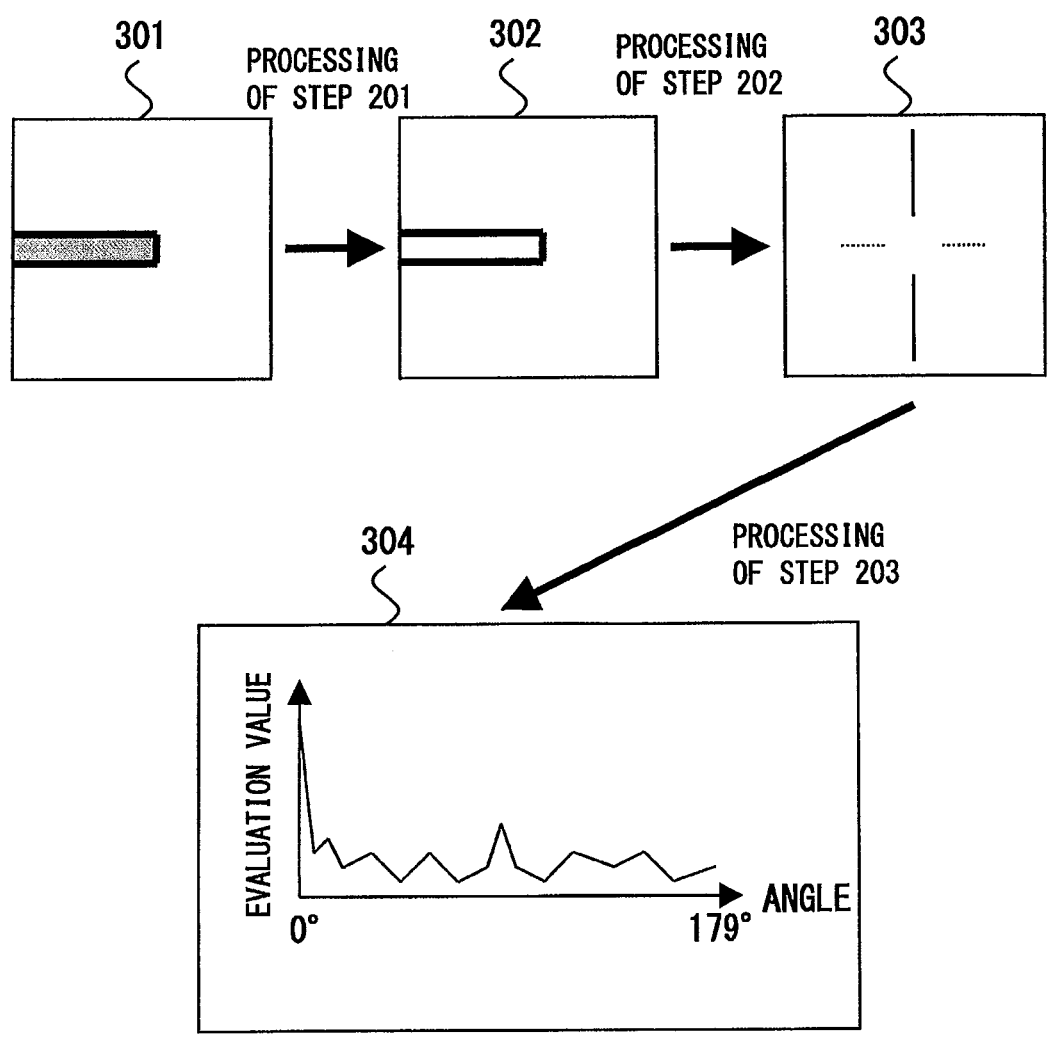
FIG. 3 is a diagram showing example states occurring during processing according to the first embodiment.

FIG. 3 shows example states occurring during processing according to the first embodiment.

An example photographed image 301 shows a horizontally extending form. Processing of the foregoing step 201 transforms the image into an example preprocessed image 302. The example preprocessed image 302 is an edge-detected image showing long horizontal lines and a short vertical line. When processing of step 202 is performed, an example Fourier-transformed image 303 is generated. In the example Fourier-transformed image 303, the origin (0 frequency) is located in the center of the image. In this example, with the image before being Fourier-transformed showing long horizontal lines, large values tend to appear on a vertical line differing in direction by 90° from the horizontal lines in the image before being Fourier-transformed. When processing of step 203 is performed, example evaluation value data 304 is obtained. In the present case, the evaluation value is the highest for 0° (horizontal direction in the original image). Hence, it is known that the rotation angle from normal position is 0°.

(1-6) Additional 1

Even though, in the foregoing, Eq. 1 is used for evaluation value calculation, there are other methods of calculating an evaluation value. For example, another evaluation value V2 (θ) can be calculated using the following equation Eq. 2.

$$V2(\theta)=\Sigma\text{abs}(G(N/2-\sin(\theta)*r,N/2-\cos(\theta)*r) \qquad \text{Eq. 2}$$

In the above equation, abs( ) means adopting absolute values of the values (complex numbers) included in the function, and Σ means calculating the sum of values at r=1 through r=N/2 like in Eq. 1.

Namely, Eq. 2 means calculating the sum of squares of evaluation values obtained by referring to every pixel point along the direction of θ+90° beginning at the origin of the Fourier-transformed image.

(1-7) Additional 2

Even though, in the method described above, evaluation values are obtained for the angles ranging from −45° to 134° in increments of 1°, it is also possible to obtain evaluation values additionally for the angles shifted by 90°. In this case, evaluation value V3(θ) and V4(θ) representing the sum of evaluation values for the angles ranging from −45° to 44° in increments of 1° can be calculated using the following equation Eq. 3 and Eq. 4.

$$V3(\theta)=V1(\theta)+V1(\theta+90°) \qquad \text{Eq. 3}$$

$$V4(\theta)=V2(\theta)+V2(\theta+90°) \qquad \text{Eq. 4}$$

(1-8) Additional 3

Even though, in the method described above, evaluation values are obtained for the angles ranging from −45° to 134° in increments of 1°, it is also possible to obtain evaluation values for the angles ranging from −45° to 134.9° in increments of 0.1° or for the angles ranging from +20° to −20° in increments of 0.1°. Thus, the range of angles to be evaluated and their increments can be optionally set according to the purpose of evaluation.

(1-9) Additional 4

Even though, in the method described above, the angle where the evaluation value is the largest is determined as the rotation angle from normal position of the image, there are cases in which, depending on the image, the angle where the evaluation value is the largest is shifted by a certain angle α from the rotation angle from normal position of the image. In such cases, the rotation angle from normal position of the image is obtained by subtracting the angle α specific to the image from the angle where the evaluation value is the largest.

When it is assumed that rotation of an image does not exceed a range of ±45° and that, when an image rotation angle detected is outside the range of ±45°, it is an angle shifted by 90°, any detected rotation angle in the range from 45° up to, but not including, 135° is subtracted by 90° and the subtracted angle is determined as the image rotation angle.

Furthermore, evaluation values for angles each shifted by 90° may be added together to generate a new evaluation value. For example, evaluation values for angles ranging from 45° to, but not including, 135° and evaluation values for angles subtracted by 90° may be added together to generate new evaluation values, and the rotation angle may be detected based on the new evaluation data.

(1-10) Occurrence of Large Error

Figure 4:
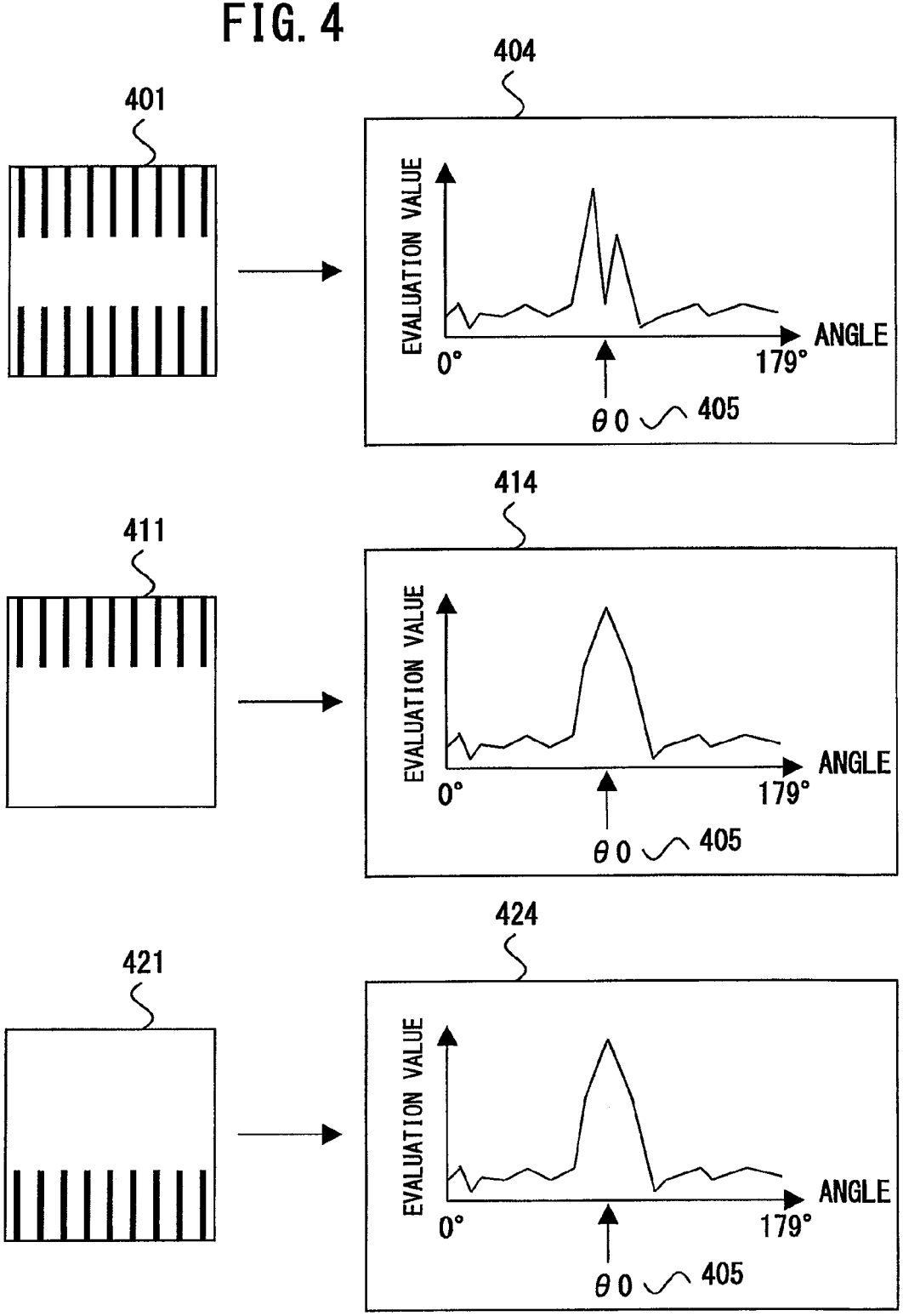
FIG. 4 is a diagram showing example images and corresponding evaluation data according to the first embodiment.

The first embodiment of the present invention has a drawback that, when an image to be processed shows widely broken-apart straight lines, a large angle detection error occurs depending on the case. This is illustrated in FIG. 4. In the case of an image 401 showing many parallel lines which are widely broken apart at around their middle portions, there can be cases in which evaluation value data 404 obtained by applying the first embodiment of the present invention indicates that the data curve portion corresponding to angle 405, denoted as θ0, representing the normal position of the image is largely dented with two peaks formed on both sides thereof, even though the dented portion should normally form a peak representing the largest evaluation value. Even a slight shifting of the rotation angle from normal position of an image affects the shapes of evaluation data peaks and changes the difference in size between the two peaks. In such a case, even if the data is smoothed by applying a smoothing filter, angle detection becomes unstable and an angle detection error may even exceed 1°.

When an image 411 showing only an upper part of the broken-apart parallel lines is generated, the evaluation value data on the upper-part extracted image becomes as denoted by 414. In this case, the angle detection error for the normal position of the image is small. When an image 421 showing only a lower part of the broken-apart parallel lines is generated, the evaluation value data on the lower-part extracted image becomes as denoted by 424. In this case, the angle detection error for the normal position of the image is small.

As described above, when the upper and lower parts of the broken-apart parallel lines are evaluated separately, the angle detection error becomes small, whereas when an image including both the upper and lower parts of the broken-apart parallel lines is evaluated, the angle detection error may become large. As described above, evaluating an image combining two separate images does not generate an evaluation result which equals the sum of evaluation results of the two images. This is because the pixel values after Fourier transform are represented by complex numbers and the absolute values of the complex numbers are used in obtaining evaluation values.

As described above, when an image to be processed shows widely broken-apart lines, generating an image showing only one half part of the broken-apart lines and evaluating the image according to the first embodiment enables angle detection without a large error. In the preprocessing performed in step 201, it is possible to check whether the image to be processed shows widely broken-apart lines and, when such broken-apart lines appear in the image, evaluate only one-half part of the broken-apart lines.

(2) Second Embodiment

(2-1) Difference from First Embodiment

The second embodiment of the present invention is configured to be the same as the first embodiment. The procedure of the second embodiment of the present invention partly differs from that of the first embodiment. Step 502, in particular, makes up a major characteristic of the second embodiment.

(2-2) Outline of Processing Procedure

Figure 5:
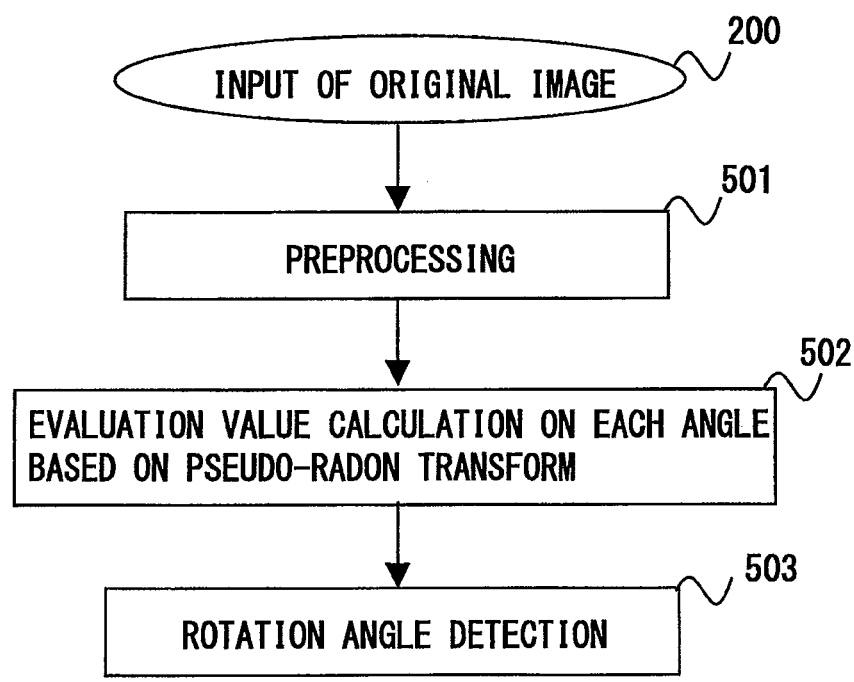
FIG. 5 is a flowchart showing a whole procedure of the second embodiment.

FIG. 5 shows an overall flow of processing performed according to the second embodiment of the present invention. The processing is performed by the computing device 106. The processing will be described in the following with reference to the numbers indicated in FIG. 5 as step numbers.

Step 200: A photographed image of a semiconductor in a manufacturing process is inputted.

Step 501: The photographed image is preprocessed. Details of the preprocessing will be described in the next section.

Step 502: Evaluation value data on the preprocessed image is generated by calculating, based on pseudo-Radon transform, evaluation values for predetermined rotation angles. The predetermined rotation angles are relatively small angles dependent on the image size. For example, evaluation value data is generated by obtaining, based on pseudo-Radon transform, evaluation values for non-linear discrete angles in a range of about ±10° determined based on the image size. The concrete method of calculation will be described in section (2-4).

Step 503: The rotation angle associated with the largest one of the evaluation values for all rotation angles is determined. The rotation angle thus determined is determined to be the rotation angle from normal position.

(2-3) Details of Processing in Step 501

Figure 6:
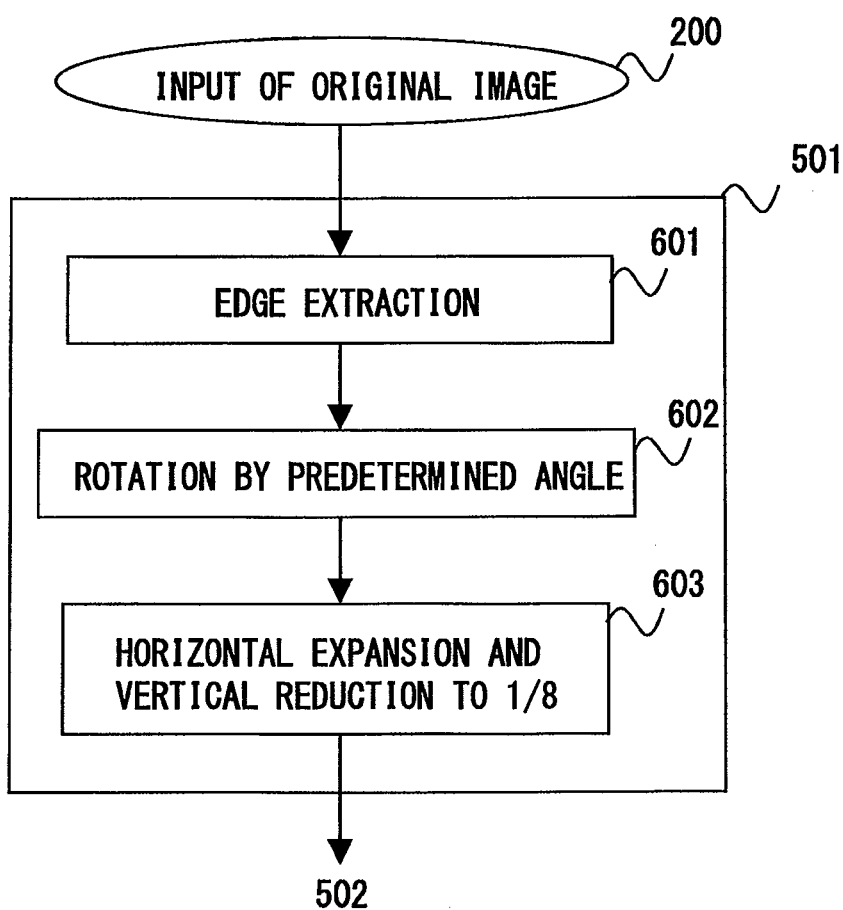
FIG. 6 is a flowchart showing a procedure of processing 501 according to the second embodiment.

The procedure of processing performed in step 501 is shown in FIG. 6. The procedure of step 501 will be divided into plural steps and will be described below with reference to the numbers indicated in FIG. 6 as step numbers.

Step 601: Edge extraction processing is performed as in the first embodiment.

Step 602: When obtaining evaluation value data on small angles centered around the horizontal direction (0°), the image is rotated −90° or 90°. When obtaining evaluation value data on small angles centered around the vertical direction (90°), the image is not rotated. When obtaining evaluation value data on small angles centered around angle θ1, the image is rotated −θ1−90° or −θ1+90° to cause the angle θ1 in the original image to be vertical after the rotation.

Figure 8:
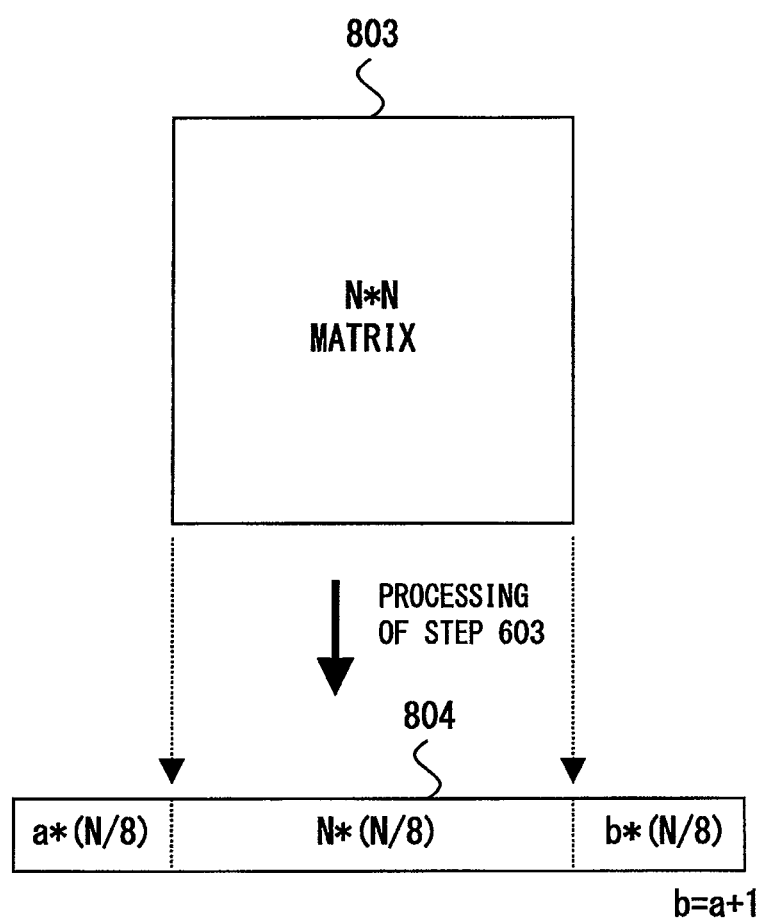
FIG. 8 is a diagram showing example sizes of input and output images processed in processing 603 according to the second embodiment.

Step 603: An image 804 is generated by, as shown in FIG. 8, adding line a to the right of and line b to the left of an image 803 where b=a+1 and reducing the vertical size of the image 803 to ⅛. This processing is represented by the following equation Eq. 5 in which I1(x, y*8+d) represents the original image 803 and I2(x+a, y) represents the processed image 804.

$$I2(x+a,y)=\Sigma I1(x,y*8+d)/8 \qquad \text{Eq. 5}$$

In the above equation, Σ means adding values for d=0 through d=7, and (x, y) represents the coordinates of a point in the matrix of the processed image. When the number of matrix points N in the y direction of I1 (vertical direction) is not divisible by 8, it is necessary to perform special processing to appropriately make up for missing tail data. For example, the matrix may be reduced by ignoring the existing tail data. Or, when the existing last data in a matrix is not followed by any subsequent data to fill the matrix, it may be assumed that the matrix is filled by repetition of the last data so as to treat the matrix as divisible by 8.

FIG. 8 shows example images, one before being processed and the other after being processed, with a matrix size of N*N and a matrix size of (N+a+b)*(N/8), respectively. The image 803 before being processed is reduced, by the average pixel method, to ⅛ in the vertical direction to form a predetermined central portion of the processed image 804 with the central portion being formed of a matrix of N*(N/8). The processed image includes the lines a and b horizontally added on the left and on the right thereof. The data value of each of the additional lines is 0.

(2-4) Step 502

Figure 9:
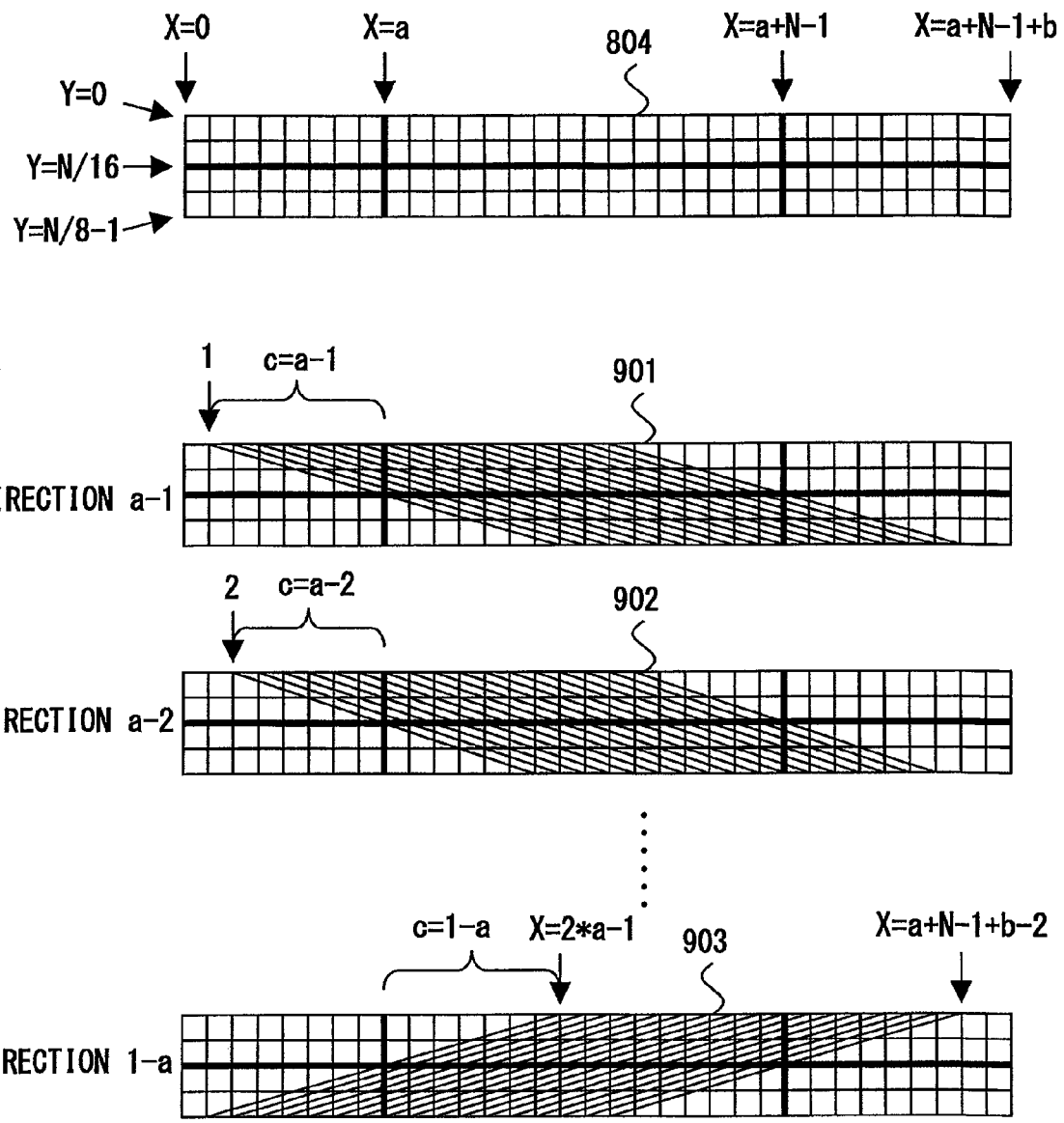
FIG. 9 is a schematic diagram showing the manner in which processing 502 is performed according to the second embodiment.

FIG. 9 illustrates pseudo-Radon transform. The image 804 generated by preprocessing the original image includes the additional lines a and b on the left and on the right thereof, respectively. As described above, the original image having been vertically reduced to ⅛ is stored with its upper left corner point positioned at coordinates (a, 0) and lower left corner point positioned at coordinates (a+N−1, N/8−1).

In FIG. 9, lines (parallel lines) representing projection directions at the time of pseudo-Radon transform are shown. Each of the parallel lines is made to pass, when Y=N/16, an integer coordinate point in the range of X=a through X=a+N−1. Also, each of the parallel lines is made to pass, when Y=0, a point where the horizontal coordinate X has an integer value. For example, parallel lines are drawn as shown by FIGS. 901, 902, and 903 included in FIG. 9.

The X coordinate value (referred to as xL) when Y=0 of the leftmost one of the parallel lines is a characteristic indicative of the direction of the parallel lines. Hence, in the following, with c defined as c=a−xL, the direction of parallel lines will be represented by c instead of xL. For example, the direction of the parallel lines shown in FIG. 901 is c=a−1; the direction of the parallel lines shown in FIG. 902 is c=a−2; and the direction of the parallel lines shown in FIG. 903 is c=1−a.

When Y=N/16, the parallel lines pass, without fail, the points of X=a through X=a+N−1 regardless of direction c, so that each of the X coordinate values (denoted as X=f) is a characteristic indicative of one of the many parallel lines. When g is defined as g=f−a, g assumes an integer value ranging from 0 to N−1 to identify the individual parallel lines. Namely, the parallel lines are numbered from 0 to N−1 in the direction of left to right.

When projecting a No. g line of direction c, the values of all points where Y is an integer on No. g line are added. Namely, projection P (c, g) of No. g line of direction c is calculated using the following equation Eq. 6.

$$P(c,g)=\Sigma I2(a-c*((N/16)-y)/(N/16)+g,y) \quad \text{Eq. 6}$$

In the above equation, Σ means adding the evaluation values for y=1 through y=(N/8)−1.

The reference points such as I2(a−c*((N/16)−y)/(N/16)+g, y) each assume an integer Y-coordinate value, whereas their X coordinate values are generally non-integer, real-number values, so that they do not have pixel values. Their values are determined by interpolation based on adjacent pixels. Interpolation can be made in various ways. In the following, interpolation based on cubic convolution will be described with reference to FIG. 14.

Figure 14:
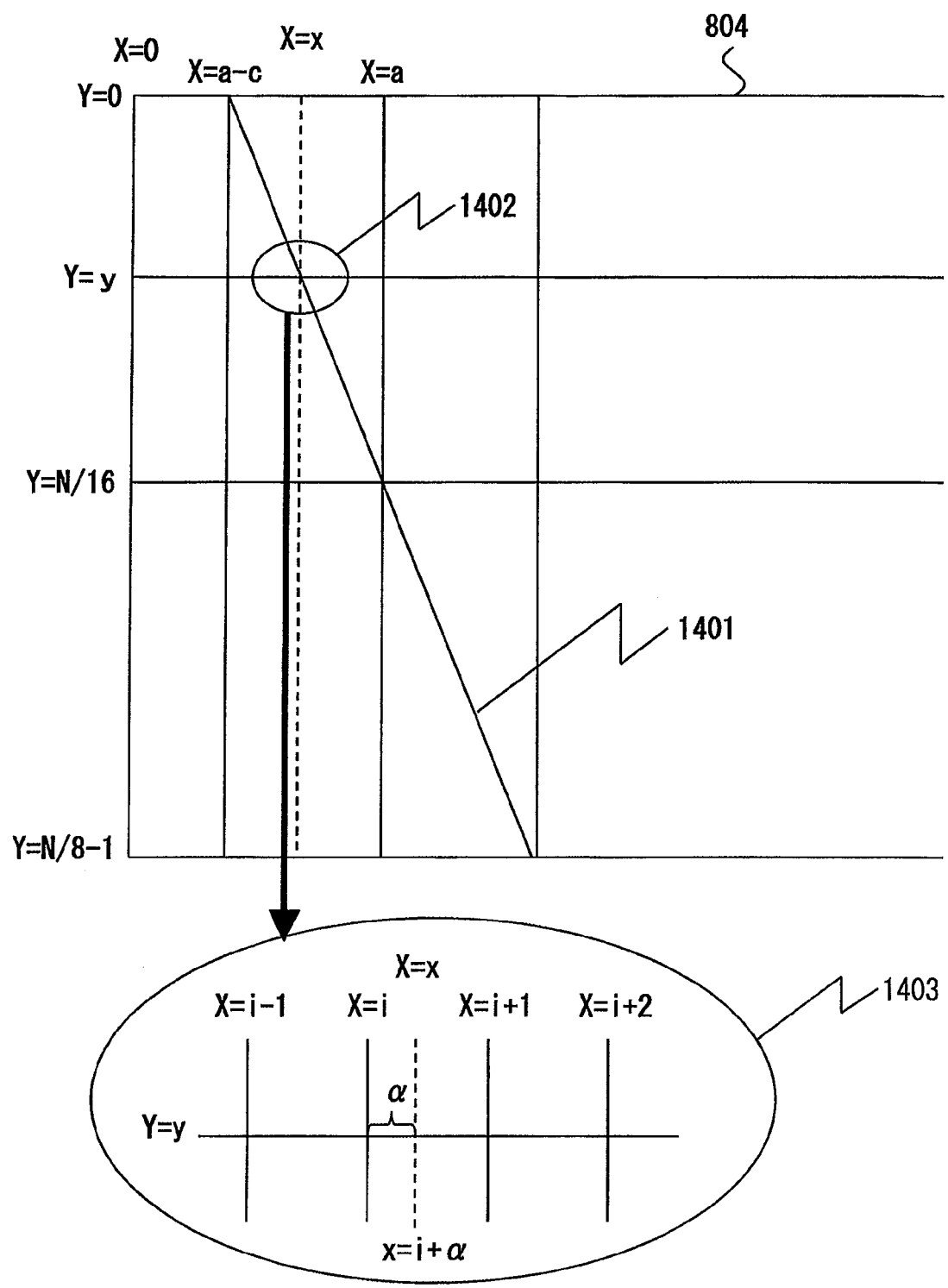
FIG. 14 is a diagram showing detailed condition of a reference point according to the second embodiment.

FIG. 14 shows the positional relationship between line 1401 of No. g=0 and direction c and the reduced image 804 (I2). An area 1402 around the intersection of line 1401 and the line of Y=y is shown enlarged as an enlarged view 1403.

The X coordinate x of the intersection (x, y) of line 1401 and the line of Y=y is generally represented by a real-number with a decimal fraction. With x being i+α, i is an integer number and α is a decimal fraction smaller than 1 but not smaller than 0. As shown in the enlarged view 1403 of the area around the intersection, the area around the intersection I2(x, y) includes, in the vicinity of the line of Y=y, pixels I2(i−1, y), I2(i, y), I2(i+1, y), and I2(i+2, y) of the reduced image 804(I2). Based on these four points, I2(x, y) is interpolated by cubic convolution using the following equation Eq. 7.

$$I2(i+a, y) = h(-a-1)*I2(i-1, y) + h(-a)*I2(i, y) + \\ h(-a+1)*I2(i+1, y) + h(-a+2)*I2(i+2, y) \quad \text{Eq. 7}$$

In the above equation, i is an integer number, and α is a real number not smaller than 0 but smaller than 1 (decimal fraction). I2 represents the reduced image 804, and function h( ) is an interpolation factor calculated by the following equations Eq. 8 and Eq. 9.

$$h(t)=|t*t*t|-2*t*t+1 \text{ (when } |t|\leq 1) \quad \text{Eq. 8}$$

$$h(t)=-|t*t*t|+5*t*t-8*|t|+4 \text{ (When } 1<|t|\leq 2) \quad \text{Eq. 9}$$

Regarding the intersection (x, y) of line 1401 of direction c and No. g=0 and the line of Y=y, the method of interpolation for I2(x, y)=I2(i+α, y) has been described. With line 1401 being of direction c and No. g=0, the intersection of a line of No. g and the line of Y=y has coordinates (x+g, y). To evaluate point I2(x+g, y)=I2(i+α+g, y), the foregoing equation Eq. 7 is used with the X coordinate value in each term added by g. What is important in this connection is that, with g being an integer, the decimal fraction α is unchanged regardless of the value of g as long as the direction c is unchanged. This means that, when referring to intersections of a same Y coordinate, a same interpolation factor h can be applied. Hence, when calculating projection P(c, g) of each of the parallel lines advancing in the direction of g (sequentially referring to intersections on the same line of Y=y for calculation), the decimal fraction α and interpolation factor h need to be calculated only once for all intersections on the line of Y=y. This speeds up the calculation.

In the manner described above, projection P (c, g) is calculated for every line of direction c and No. g in the whole range (for all integers of −a+1≤c≤a−1 and 0≤g≤N−1).

When, in the preprocessing performed in step 602, the original image is rotated −θ1−90° or −θ1+90°, the vertical direction of the reduced image 804 represents the direction of θ1 in the original image. That is, the direction c=0 in the projected image represents the direction of angle θ1 in the original image. When it is assumed that the direction c in the projected image represents the direction of angle θ2 in the original image, the relationship between θ2 and c is expressed by the following equation Eq. 10.

$$\theta2(c)=\theta1+\arcsin(c/(N/2)) \quad \text{Eq. 10}$$

Regarding the direction c, c has an integer value in the range of 1−a to a−1, so that the corresponding angles θ2(c) in the original image are unequally spaced discrete angles. The range of evaluation for θ2(c) is dependent on the value of a, and the value of a can be adjusted such that arcsin(c/(N/2)) does not exceed 10°. For example, when N=256, a=23 and the value given by arcsin(c/(N/2)) is about 9.9°.

In the case of N=256, arcsin(1/128)≈0.448°, arcsin(2/128)≈0.895°, - - - , arcsin(21/128)≈9.44°, and arcsin(22/

128)≈9.90°. Thus, projections on direction angles in increments of about 0.5° can be generated.

When projection data P(c, g) is obtained using equations Eq. 6 to Eq. 9, the evaluation value $V5(\theta(c))$ can be obtained using the following equation Eq. 11.

$$V5(\theta(c))=\Sigma P(c,g)*P(c,g) \qquad \text{Eq. 11}$$

In the above equation, Σ means adding the values obtained with g ranging from 0 to N−1.

(2-5) Example States Occurring During Processing

Figure 7:
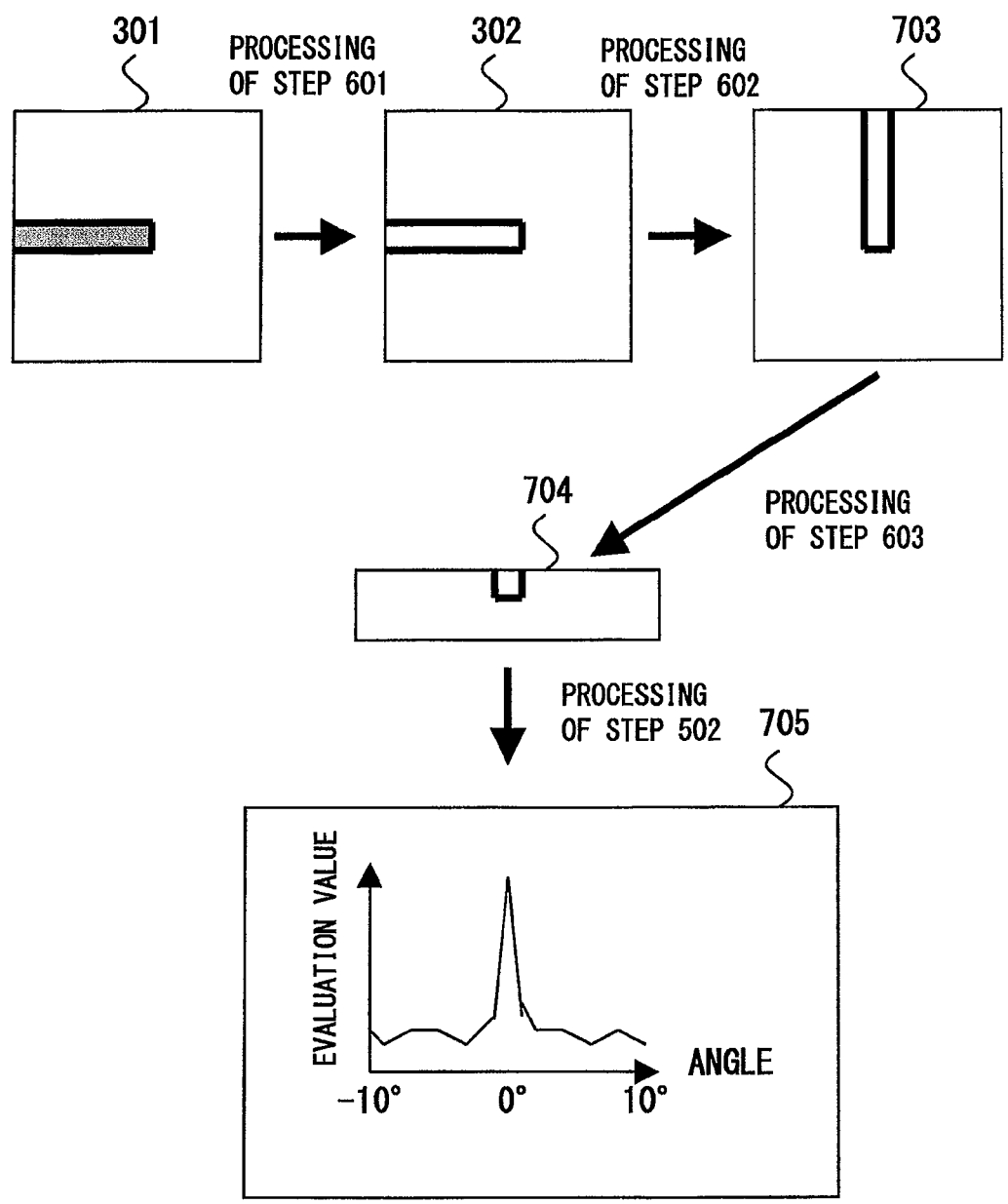
FIG. 7 is a diagram showing images generated during processing according to the second embodiment.

FIG. 7 illustrates example states occurring during processing according to the second embodiment.

It is assumed that an example photographed image 301 is the same as the image 301 shown in FIG. 3 illustrating states occurring during processing according to the first embodiment. Subjecting the photographed image 301 to processing performed in the foregoing step 601 generates an example image 302 the same as when the preprocessing (edge extraction) of the foregoing step 201 is performed. When the image 302 is rotated in step 602, an example image 703 is obtained as an image having been rotated during preprocessing. In the example shown in FIG. 7, the image is rotated 90° clockwise to make it appear along the vertical direction. When the processing of step 603 is performed, an example image 704 expanded horizontally and reduced vertically is obtained as an image after completion of the preprocessing. Furthermore, when the processing of step 502 is performed, example evaluation value data 705 is obtained.

The example evaluation value data 705 is data on small angles in a range of about ±10°. The evaluation value is the largest at angle 0° (horizontal in the original image). Hence, it is known that the rotation angle from normal position is 0°.

(2-6) Additional 1

Even though, in the above example, the evaluation value is calculated using equation Eq. 11, there are also other calculation methods which can be used. For example, another evaluation value $V6(\theta(c))$ can be calculated using the following equation Eq. 12.

$$V6(\theta(c))=\Sigma \text{abs}(P(x+a)) \qquad \text{Eq. 12}$$

In the above equation, abs( ) means adopting absolute values of the values (complex numbers) included in the function, and Σ means, like in the case of Eq. 11, calculating the sum of values for x=0 through x=N−1.

Equations Eq. 11 and Eq. 12 can be used to calculate the degrees of line existence as evaluation values. The two equations do not differ much. They differ, at the most, as to what to do with overall weighting when an image to be processed includes long lines. When the degree of line existence in an image largely differ between directions, the evaluation values obtained using the two equations result in angle detection without much difference between the two equations. A different type of evaluation value may also be used as long as it reflects the degree of line existence in an image.

(2-7) Additional 2

In the above processing, when, in step 602, rotating an image by a small angle from θ1, the image is rotated −90° or +90° from θ1. The evaluation value obtained as a result of such rotation of the image may be added to by another evaluation value obtained after the image is further rotated 90° and the sum of the two evaluation values may be made a new evaluation value.

The evaluation value to be obtained by further rotating the image 90° may be obtained by, without further rotating the image 90°, changing the processing performed in step 603, namely, by vertically expanding the image and horizontally reducing the image to ⅛ and by changing the direction of projection 90° so as to realize projection in the horizontal direction.

(2-8) Additional 3

Even though, in the foregoing step 503, the rotation angle associated with the largest one of the evaluation value data on all rotation angles is determined, it is also possible to filter the evaluation value data on all rotation angles, thereby generating filtered evaluation value data, detect the rotation angle associated with the largest one of the filtered evaluation value data, and determine the detected rotation angle as the rotation angle from normal position of the image.

As the evaluation data is obtained on small angles, the cyclic connection as done in the first embodiment cannot be made in the second embodiment.

(2-9) Additional 4

In the foregoing step 503, the original image is rotated by angle θ1. When the angle evaluation range is to be about ±10°, it is possible to generate evaluation data on angles in a range of about ±30°. This can be done by further rotating the image 20° from its position after being rotated by angle θ1, generating evaluation data on angles in a range of about 10° to 30° on the original angle basis, then rotating the image −20° from its position after being rotated by angle θ1, generating evaluation data on angles in a range of about −10° to −30° on the original angle basis, and connecting the evaluation data thus generated so as to obtain evaluation data on angles in a range of about ±30°.

It is also possible to generate evaluation data on angles in a range of about ±45°. This can be done by determining the evaluation angle range to be about ±15° instead of about ±10° and obtaining additional evaluation data after further rotating the image ±30°.

(2-10) Additional 5

Even though in the foregoing step 603, the image is vertically reduced to ⅛, the reduction ratio may be changed according to the angle range to be evaluated and the characteristics of the input image, for example, to ¼ or ½, or the image size may be left unchanged.

Even though, in the foregoing step 603, the image is horizontally expanded and the expanded portions each have a data value of 0, it is possible not to horizontally expand the image leaving a=0 and b=0 and not to include any portion outside the image area in projection.

(2-11) Characteristics

Processing according to the second embodiment does not cause, unlike in the case of the first embodiment, the angle detection error to increase even when widely broken-apart lines are included in the image to be processed.

In the second embodiment, however, the angle detection range is as narrow as ±10°, so that, to detect an angle in a wider range, it is necessary to repeat angle detection after rotating the image. A disadvantage of the second embodiment is that, when detecting an angle in a wide range, it takes longer calculation time than the first embodiment.

The processing of step 503 referred to as pseudo-Radon transform in the present specification is characterized in that: the distance between parallel lines for taking a projection is dependent on parameter c which determines the angle of the parallel lines; the intersections of the parallel lines and the horizontal axis are the points to be referred to for taking a projection; and, therefore, the distance in the projection direction between the reference points are dependent on parameter c. In the case of well-known Radon transform: the distances between parallel lines are uniform regardless of the parallel line angle; reference points are set like points on a lattice perpendicularly intersecting with the parallel lines and the distance between the reference points in the projection direction is also uniform. Therefore, for bicubic interpolation by general Radon transform, 16 points in the vicinity of an interpolation point are referred to and 16 factors are calculated for each interpolation point, so that interpolation takes time. In pseudo-Radon transform according to the present embodiment, a same factor is referred to when referring to four points in the neighborhood of an interpolation point and points along the horizontal axis direction. This makes it possible to save most of the factor calculations. Hence, pseudo-Radon transform takes less calculation time than well-known Radon transform.

(3) Third Embodiment

(3-1) Differences from First and Second Embodiments

The configuration of a third embodiment of the present invention is the same as the configuration of the first embodiment. The procedure of the third embodiment of the present invention is a combination of the procedures of the first and second embodiments of the present invention.

(3-2) Processing Procedure

Figure 10:
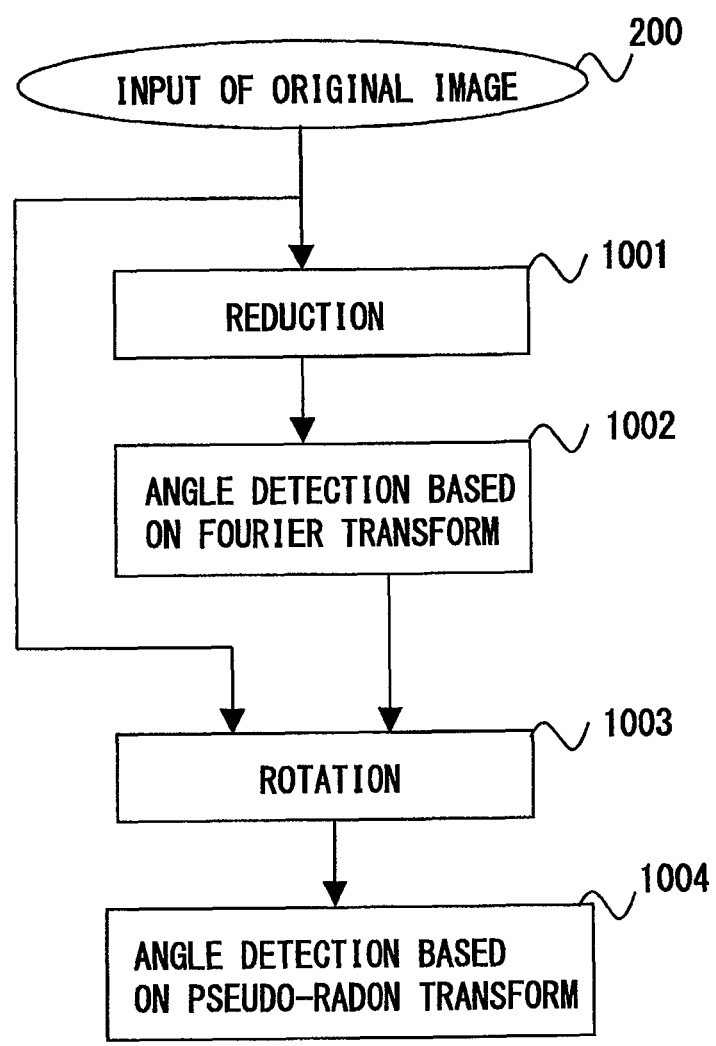
FIG. 10 is a flowchart showing a whole procedure of the third embodiment.
Figure 11:
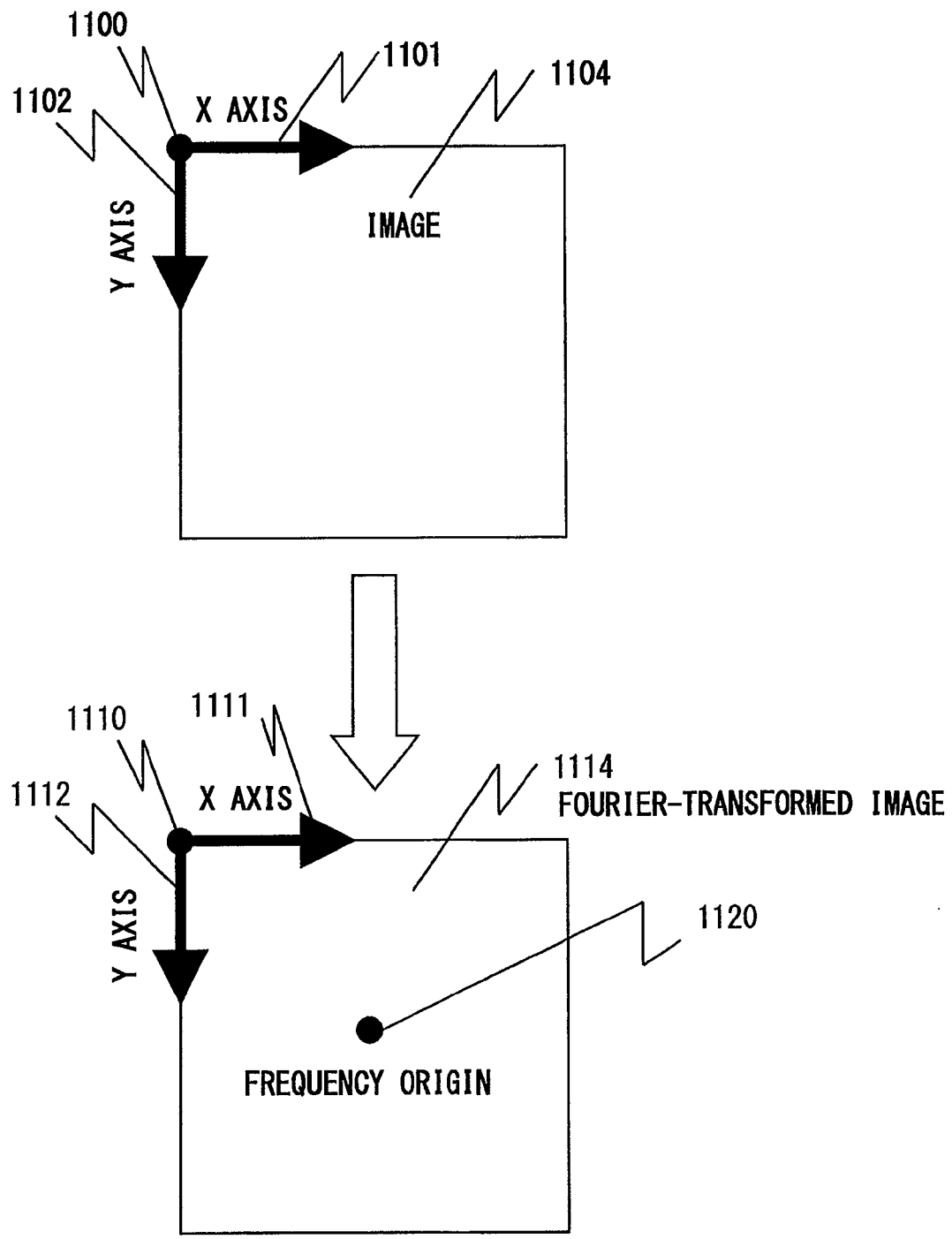
FIG. 11 is a diagram showing coordinate systems of an image and a Fourier-transformed image.
Figure 12:
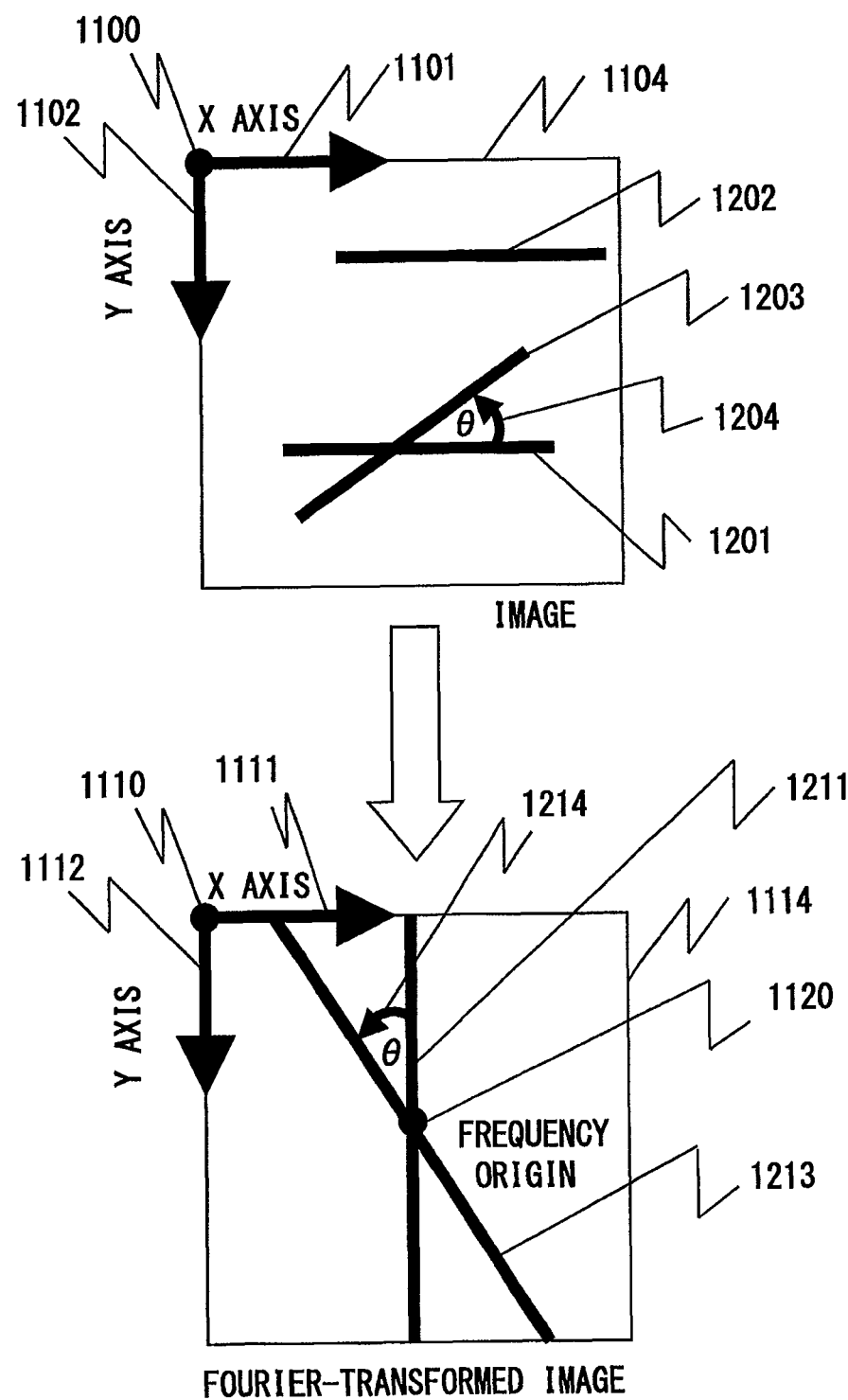
FIG. 12 is a diagram showing relationship regarding lines and angles on a Fourier-transformed image.

FIG. 10 shows an overall flow of processing performed according to the third embodiment of the present invention. The processing is performed by the computing device 106. The processing will be described in the following with reference to the numbers indicated in FIG. 10 as step numbers.

Step 200: A photographed image of a semiconductor in a manufacturing process is inputted.

Step 1001: The photographed image is reduced to ¼ both vertically and horizontally. The average value of 4*4 pixels of the input image becomes the value of one pixel of the output image.

Using the image reduced to ¼ both vertically and horizontally as the input image, the normal position angle of the image is detected by the method of the first embodiment. Namely, the image reduced to ¼ both vertically and horizontally is subjected to the preprocessing as performed in the first embodiment; the preprocessed image is Fourier-transformed; evaluation value data is generated by obtaining evaluation values for angles ranging from 0° to 179° in increments of 1°; and the angle associated with the largest one of the evaluation values is determined.

Step 1003: The photographed image or the preprocessed photographed image is rotated such that the angle determined in step 1002 agrees with the predetermined direction, vertical or horizontal and, thereby, a rotation-corrected image is generated.

Step 1004: Using the rotation-corrected image generated in step 1003 as an input image, the normal position angle is detected by the method of the second embodiment. Since the image has already been rotated, the angle of rotation as performed in the foregoing step 602 is set to 0°. Namely, after edges are extracted in step 601, step 602 is skipped and processing advances to step 603 to generate an image preprocessed as in the second embodiment. Subsequently, by performing the processing of step 502, evaluation value data on angles in a small range of about ±10° is generated, then, in step 503, angle detection is performed.

The normal image angle with respect to the original image is determined based on the angle detected in step 1002 and the angle detected in step 1004.

(3-3) Angle Detection

Step 1002 serves as a first angle detection means; step 1003 serves as an image rotation correction means executed based on the angle detected by the first angle detection means; and step 1004 serves as a second angle detection means.

In cases where the image is rotated in step 1003 so as to make the angle detected in step 1002 appear vertically, a small angle around the vertical direction is detected in step 1004. Also, in cases where the image is rotated in step 1003 so as to make the angle detected in step 1002 appear vertically, a small angle around the vertical direction is detected in step 1004.

In cases in which the image is rotated in step 1003 so as to make the angle detected in step 1002 appear vertically, the rotation angle from normal position of the image is the angle detected in step 1002 plus the angle detected in step 1004 less 90°. Also, in cases in which the image is rotated in step 1003 so as to make the angle detected in step 1002 appear vertically, the rotation angle from normal position of the image is the angle detected in step 1002 plus the angle detected in step 1004.

When the image rotation angle is assumed to exceed neither +45° nor −45°, the angle to be detected is obtained by adding or subtracting an integer multiple of 90° to or from the above detected angle such that the resultant angle added to or subtracted from is in the range of ±45°.

(3-4) Characteristics

The third embodiment is advantageous in that, by making up for disadvantages of the first and second embodiment, it enables quick and accurate detection of the rotation angle from normal position of an image.

DESCRIPTION OF SYMBOLS

101 Stage
102 Inspection object
103 Electron gun
104 Secondary electron detection unit
105 Imaging unit
106 Computing device
107 Display device
200 Input of image
201 Preprocessing
202 Fourier transform
203 Evaluation value calculation for each angle 204 Rotation angle detection
301 Example photographed image
302 Example preprocessed image
303 Example Fourier-transformed image
304 Example evaluation value data
401 Example image
404 Evaluation value data on image 401
405 Angle of normal position
411 Image showing upper part only of parallel lines
414 Evaluation value data on upper-part extracted image
421 Evaluation value data on lower-part extracted image
424 Evaluation value data on lower-part extracted image
501 Preprocessing
502 Pseudo-Radon transform
503 Rotation angle detection
601 Edge extraction
602 Rotation
603 Horizontal expansion and vertical reduction
703 Example image rotated during preprocessing
704 Example image after completion of preprocessing
705 Example of evaluation value data
803 Image before processing
804 Image after processing
904*a* Image generated by preprocessing
904*b* Example image
904*c* Example image
904*d* Example image
1001 Reduction
1002 Angle detection based on Fourier transform
1003 Rotation
1004 Angle detection based on pseudo-Radon transform
1100 Origin of image
1101 X axis
1102 Y axis
1104 Image
1110 Origin of Fourier-transformed image
1101 X axis
1112 Y axis
1114 Fourier-transformed image
1120 Frequency origin
1201 Line in X-axis direction
1202 Another line in X-axis direction
1203 Line of angle θ relative to X axis
1211 Linear form in X direction
1213 Linear form in θ direction
1300 Concentric circle
1301 Upward line direction
1302 45° direction
1303 135° direction
1401 Line of direction c and No. g=0
1402 Area around intersection
1403 Enlarged view of area around intersection

The invention claimed is:

1. A device for detecting a rotation angle from a normal position of an image, the device comprising:
an electron microscope configured to generate an original photographed image of an inspection object;
a computing device coupled to the electron microscope, wherein the computing device is configured to:
based on one of the original photographed image and the original photographed image having been subjected to predetermined preprocessing used as an input image, generate a plurality of equally-spaced virtual parallel lines that extend at each angle of a plurality of angles,
at each angle that the plurality of equally-spaced virtual parallel lines extend, of the plurality of angles, generate an evaluation value based on reference points of each of the equally-spaced virtual parallel lines, the reference points are points of intersection of each of the equally-spaced virtual parallel lines and horizontal axis lines of the input image, or the reference points are points of intersection of each of the equally-spaced virtual parallel lines and vertical axis lines of the input image;
generate evaluation value data based on the evaluation value of the equally-spaced virtual parallel lines extending at each of the plurality of angles wherein a distance between each of the equally-spaced virtual parallel lines, in a direction that is perpendicular to the equally-spaced virtual parallel lines, differs depending on the angle; and
detect a desired angle of the plurality of predetermined discrete angles based on the evaluation value data.

2. The device for detecting a rotation angle from a normal position of an image according to claim 1, wherein the predetermined preprocessing includes processing in which the original photographed image is reduced in a predetermined direction.

3. The device for detecting a rotation angle from normal position of an image according to claim 1, wherein the predetermined preprocessing includes processing in which the original photographed image is copied to generate an image expanded by a predetermined length along a predetermined one of the coordinate axes.

4. The device for detecting a rotation angle from normal position of an image according to claim 1, wherein the plurality of desired discrete angles are determined based on a size of one of the original photographed image and the original photographed image having been subjected to predetermined preprocessing.

5. The device for detecting a rotation angle from normal position of an image according to claim 1,
wherein each of the equally-spaced virtual parallel lines extend from another horizontal line, which is parallel to the horizontal lines of the input image, and each of the equally-spaced virtual parallel lines are spaced apart by one pixel.

* * * * *